2,831,654
PRINTER'S QUOIN

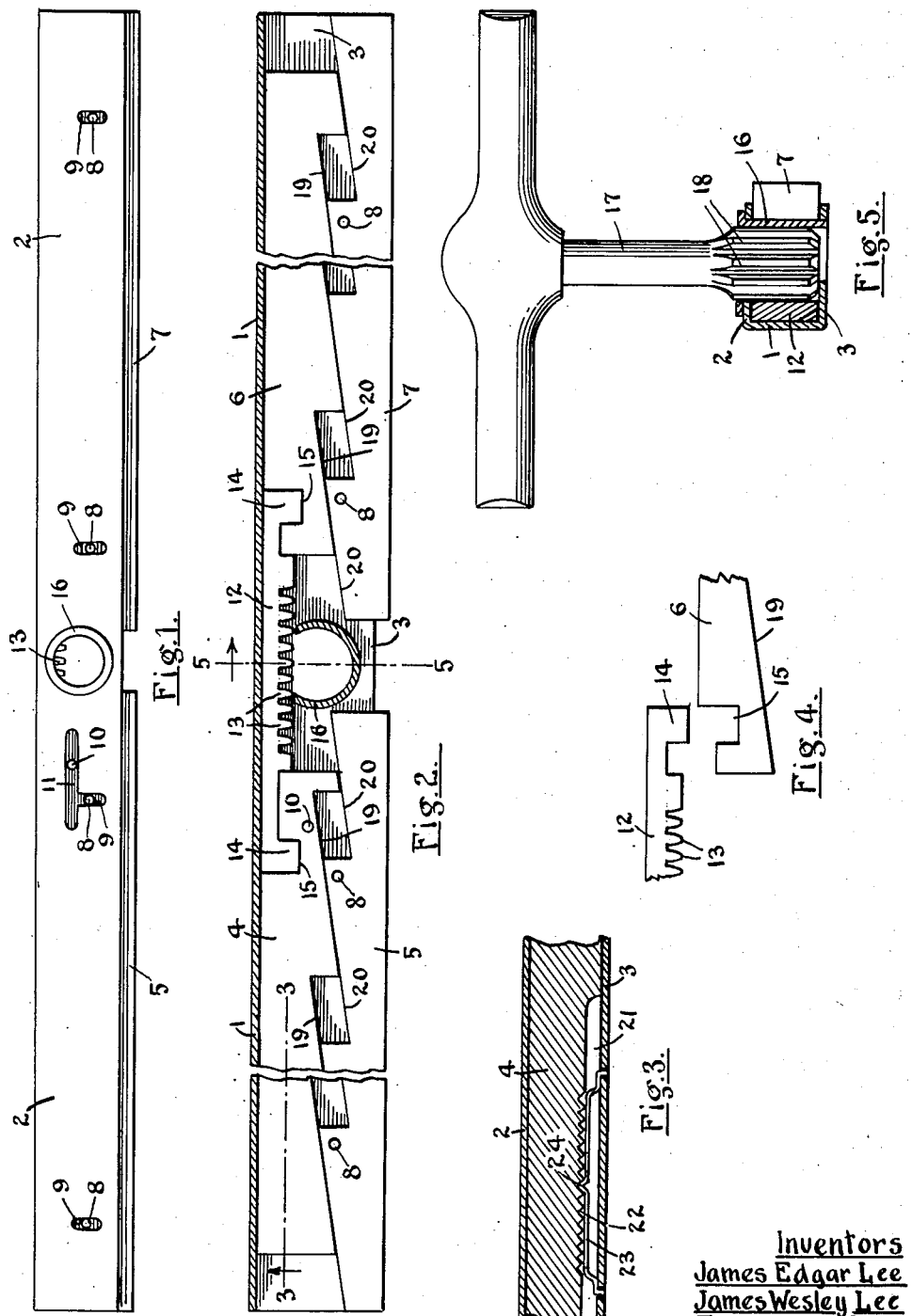

James Edgar Lee and James Wesley Lee, Grand Haven, and Freeman Barney, Spring Lake, Mich., assignors to The Challenge Machinery Company, Grand Haven, Mich., a corporation of Michigan Application February 14, 1955, Serial No. 487,794

5 Claims. (Cl. 254—42)

This invention relates to a printer's quoin which is a device used by printers to secure type in a chase by wedging action. Such quoins are used in relatively large quantities and it is desirable to keep the manufacturing cost as low as possible consistent with good quality.

This invention provides a quoin construction which utilizes cheaper materials in parts which are not subjected to severe strain, using only the more expensive material on small parts where necessary. The parts are also made in a way that they can be easily fabricated and assembled with a minimum of time and expense.

The invention is hereafter more fully described, reference being had to the accompanying drawings in which, Fig. 1 is a reduced size plan view of a quoin embodying the invention, Fig. 2 is a substantially full size plan view of the quoin with parts broken away and the upper part of the channel body removed, Fig. 3 is a fragmentary sectional elevation on the line 3—3 of Fig. 2, Fig. 4 is a fragmentary plan view of the adjacent ends of two of the parts in disassembled relation showing the interlocking hook connection between them and, Fig. 5 is a transverse sectional elevation on the line 5—5 of Fig. 2 showing the operating key in position.

Like reference numbers refer to like parts in all of the figures.

The body of the quoin is an elongated channel having a vertical bottom 1, horizontal top and bottom sides 2 and 3 and an open front. Within the channel body are located two sets of wedge slides 4, 5, 6, and 7. The inner slides 4 and 6 move longitudinally of the body and have their inner sides in slidable contact with the bottom 1 thereof. The outer slides 5 and 7 move transversely of the channel, being guided in this movement and prevented from longitudinal movement by guide pins 8 which extend through the slides 5 and 7 and traverse transverse slots 9 in said top and bottom members 2 and 3 of the channel. A guide pin 10 on the inner slide 4 traverses a longitudinal slot 11 in the top 2 of the channel, this pin 10 being only to indicate the position of the sliding parts.

The two inner slides 4 and 6, whose respective ends are spaced apart, are joined by a rack bar 12 having rack teeth 13. The ends of the rack bar 12 have hook shaped ends formed by lateral projections 14 fit into grooves 15 near the respective ends of the slides 4 and 6. When the slides 4 and 6 are connected by the rack bar 12 as shown in Fig. 2, the parts are held in place by the walls of the channel body and cannot become separated and longitudinal movement of the rack bar causes corresponding simultaneous movement of the inner slides 4 and 6.

A bushing 16 is inserted through openings in the top 2 and bottom 3 of the channel body and is secured firmly in place. This bushing has an open side through which the teeth 13 of the rack bar 12 extend and a key 17 having pinion teeth 18 is inserted so that the teeth 18 of the key mesh with the teeth 13 of the rack bar and by turning the key, the rack bar with its connected slides 4 and 6 are caused to move in either direction desired.

The contiguous faces of the pairs of slides 4—5 and 6—7 have inclined wedge faces 19 and 20 which slidably engage each other so that movement of the slides 4 and 6 to the right in Fig. 2 will wedge the slides 5 and 7 outwardly causing their outer edges to project from the channel body and movement of the slides 4 and 6 to the left will release the slides 5 and 7 so that they may be retracted into the channel.

To yieldably hold the inner slides 4 and 6 against inadvertent longitudinal movement, the under side of the slide 4 is cut away as at 21 and is provided with serrations 22 and a spring detent 23 having a prong 24 is suitably attached to the bottom 3 of the channel, the prong 24 entering said serrations 22.

Although this construction can be used on quoins of various lengths, it is particularly desirable for the longer lengths which may be as long as 18 inches and contain considerable metal. The preponderance of metal is in the wedge slides but the only part of the slides which is subjected to severe strain is the rack section having the teeth 13. A great deal of strain is put upon these teeth by turning the toothed key 17 to perform the wedging action necessary to clamp the type in the chase.

Therefore, this invention conceives making the rack bar 12 separately from the slides and being relatively small it can be made of the more costly metal, such as tool steel, and hardened or heat treated without exorbitant cost. Furthermore, being small, it is easy to handle in the machining and hardening processes.

The wedge slides 4—5 and 6—7 have only to resist the stress of pressure and, therefore, can be made of a cheap metal such as low grade steel or casting. Also, the inner and outer slides which are each made in two parts can be easily handled for such machining on them as is necessary. For example, their wedge faces and the hook grooves 15 may be broached. It is difficult to broach long parts.

Therefore, it will be seen that by use of this invention the large bulk of the metal of the quoin is made of relatively cheap material and that the only expensive part is the rack bar which is quite small. Also, the parts being divided are more easily handled in the manufacturing processes. The simple form of hook connection between the rack bar and the two inner slides is simple to make and to assemble and when in place within the channel body the parts cannot become separated and the use of other connecting means, such as screws, is obviated.

The invention is defined by the appended claims which are to be considered comprehensive of all forms coming within their scope.

We claim:

1. A printer's quoin comprising, an elongated channel shaped body, an outer wedge slide and an inner wedge slide mounted for movement in said body, both of said wedge slides having corresponding inclined wedge faces in sliding engagement with each other, means for guiding the outer wedge slide for movement transversely of the body and means for moving the inner wedge longitudinally of the body comprising a rack bar made separate from said inner wedge slide and detachably connected thereto, said rack bar being made of harder metal than the inner wedge slide.

2. The elements of claim 1 in which the connection between said inner wedge slide and said rack bar consists of interengaging hook members on each, said hook members being separable when removed from the body but being retained in interengaging position when assembled within said body.

3. A printer's quoin comprising, an elongated channel shaped body, two inner wedge slides and an outer wedge slide movably mounted within said body, said outer and inner wedge slides having corresponding inclined wedge faces in sliding engagement with each other, means for guiding said outer wedge slide for movement transversely of the body, and means for moving said two inner wedge slides simultaneously and longitudinally of said body comprising a rack bar made separate from said two inner wedge slides and joining them by detachable connections, said rack bar being made of harder metal than the inner wedge slides.

4. The elements of claim 3 in which said outer wedge slide is made in two sections each cooperating with a respective inner wedge slide.

5. The elements of claim 3 in which the connections between said two inner wedge slides and said rack bar consist of interengaging hook members on each, said hook members being separable when the parts are removed from the body but being retained in interengaging position when assembled within said body.

References Cited in the file of this patent

UNITED STATES PATENTS

| | | |
|---|---|---|
| 1,936,795 | Lee et al. | Nov. 28, 1933 |
| 2,501,949 | Lee et al. | Mar. 28, 1950 |